(12) United States Patent
Perez

(10) Patent No.: US 11,980,115 B2
(45) Date of Patent: May 14, 2024

(54) PROTECTIVE FRAME POSITION CONTROL SYSTEM FOR AGRICULTURAL WORKING VEHICLE WHEEL

(71) Applicant: CNH Industrial America LLC, New Holland, PA (US)

(72) Inventor: Thiago Kato Perez, Piracicaba (BR)

(73) Assignee: CNH Industrial America LLC, New Holland, PA (US)

( * ) Notice: Subject to any disclaimer, the term of this patent is extended or adjusted under 35 U.S.C. 154(b) by 9 days.

(21) Appl. No.: 17/959,420

(22) Filed: Oct. 4, 2022

(65) Prior Publication Data

US 2023/0107894 A1 Apr. 6, 2023

(30) Foreign Application Priority Data

Oct. 4, 2021 (BR) .......................... 1020210199474

(51) Int. Cl.
*B62D 25/18* (2006.01)
*A01B 76/00* (2006.01)

(52) U.S. Cl.
CPC .................................. *A01B 76/00* (2013.01)

(58) Field of Classification Search
CPC ...... B62D 25/186; B62D 25/182; A01B 76/00
See application file for complete search history.

(56) References Cited

U.S. PATENT DOCUMENTS

| | | | | |
|---|---|---|---|---|
| 767,242 A * | 8/1904 | Reichle, Jr. | .......... | B62D 25/186 280/157 |
| 1,341,008 A * | 5/1920 | Brown | ................ | B62D 25/186 280/156 |
| 5,169,167 A * | 12/1992 | Willson | ............... | B62D 25/186 280/157 |
| 6,349,954 B1 * | 2/2002 | Deziel | .................. | B62D 25/186 280/849 |
| 6,893,048 B2 * | 5/2005 | Rush | ..................... | B62D 25/163 280/154 |
| 8,388,003 B2 * | 3/2013 | Wellman | .............. | B62D 25/186 280/847 |
| 10,400,422 B2 * | 9/2019 | Angelo | ................ | B62D 25/163 |
| 10,518,827 B2 * | 12/2019 | Ibañez Moreira et al. | .................. | B62D 35/00 |

(Continued)

FOREIGN PATENT DOCUMENTS

| | | | | |
|---|---|---|---|---|
| FR | 2743345 A1 * | 7/1997 | ............. | B62D 25/16 |
| FR | 2813847 A1 * | 3/2002 | ........... | B62D 25/186 |

(Continued)

*Primary Examiner* — Paul N Dickson
*Assistant Examiner* — Maxwell L Meshaka
(74) *Attorney, Agent, or Firm* — Rebecca L. Henkel; Peter K. Zacharias; Rickard K. DeMille

(57) ABSTRACT

A protective frame position control system includes a wheel protective frame for a working vehicle. The wheel protective frame is mounted on a wheel via at least one bearing aligned with a center of rotation of the wheel, and a position guide 55 is associable with an upper cast of a suspension via a pin 56 to prevent rotation of the wheel protective frame and also maintain a position of the wheel protective frame at any height of the suspension of the working vehicle. The position guide comprises includes a geometry oriented vertically and compatible with a path travelled by a first end of a damping element, which is associated with the center of rotation of the wheel.

9 Claims, 15 Drawing Sheets

(56) References Cited

U.S. PATENT DOCUMENTS

| | | | | |
|---|---|---|---|---|
| 10,542,656 B2* | 1/2020 | Blunier | ................ | A01B 63/002 |
| 11,262,344 B2* | 3/2022 | Schoeny | ................ | A01B 63/16 |
| 11,453,444 B2* | 9/2022 | Bowen | ................ | B62D 25/163 |
| 11,589,494 B2* | 2/2023 | Smith | ................ | A01B 19/10 |
| 11,772,441 B2* | 10/2023 | Lumini | ................ | B60G 7/008 |
| | | | | 280/5.52 |
| 2005/0001454 A1* | 1/2005 | Rush | ................ | B62D 25/166 |
| | | | | 296/198 |
| 2006/0108765 A1* | 5/2006 | Teich | ................ | B62D 25/186 |
| | | | | 280/157 |
| 2010/0253034 A1* | 10/2010 | Crismon | ................ | B62D 25/163 |
| | | | | 280/154 |
| 2011/0080019 A1* | 4/2011 | Castillo | ................ | B62D 25/16 |
| | | | | 296/180.1 |
| 2012/0080908 A1* | 4/2012 | Wellman | ................ | B62D 25/186 |
| | | | | 293/11 |
| 2015/0230392 A1* | 8/2015 | Schafer | ................ | A01C 7/203 |
| | | | | 172/773 |
| 2015/0299982 A1* | 10/2015 | Angelo | ................ | E02F 9/0858 |
| | | | | 280/154 |
| 2018/0310459 A1* | 11/2018 | Blunier | ................ | A01B 33/087 |
| 2019/0118874 A1* | 4/2019 | Ibañez Moreira | .... | F16D 65/807 |
| 2020/0355667 A1* | 11/2020 | Schoeny | ................ | A01C 7/205 |
| 2021/0127540 A1* | 5/2021 | Smith | ................ | A01B 19/10 |
| 2022/0177043 A1* | 6/2022 | Bowen | ................ | B62D 25/18 |
| 2022/0287288 A1* | 9/2022 | de Andrade Alves | ................ | |
| | | | | A01M 7/0071 |
| 2022/0287289 A1* | 9/2022 | de Andrade Alves | ................ | |
| | | | | A01M 7/0089 |
| 2023/0018825 A1* | 1/2023 | Bowen | ................ | B62D 65/16 |
| 2023/0106231 A1* | 4/2023 | Perez | ................ | A01D 75/18 |
| | | | | 172/310 |
| 2023/0107894 A1* | 4/2023 | Perez | ................ | A01B 76/00 |
| | | | | 280/5.514 |
| 2023/0110766 A1* | 4/2023 | Lumini | ................ | B62D 25/16 |
| | | | | 280/5.52 |

FOREIGN PATENT DOCUMENTS

| | | | |
|---|---|---|---|
| KR | 101816438 B1 * | 1/2018 | |
| WO | WO-2023218256 A1 * | 11/2023 | |

* cited by examiner (DETAIL A)

(DETAIL B)

(DETAIL C)

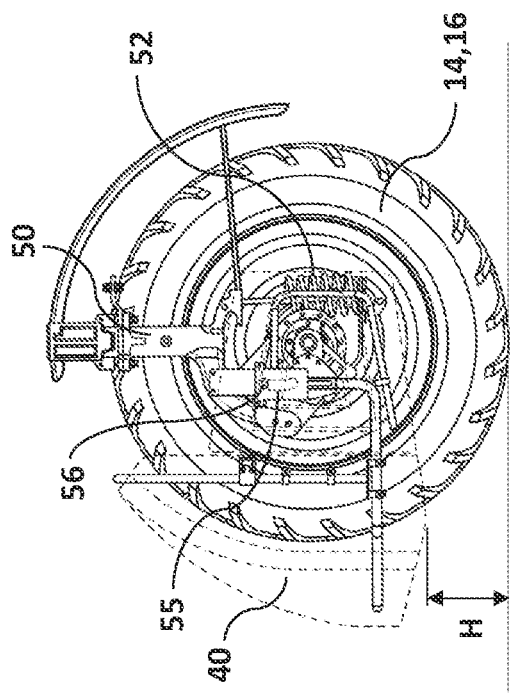
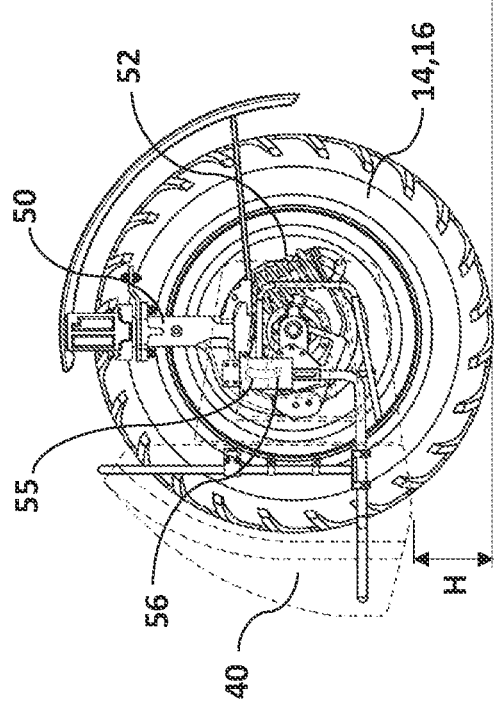

PROTECTIVE FRAME POSITION CONTROL SYSTEM FOR AGRICULTURAL WORKING VEHICLE WHEEL

CROSS-REFERENCE TO RELATED APPLICATION

This application claims priority from and the benefit of Brazilian Application No. BR 10 2021 019947 4, entitled "Protective Frame Position Control System For Agricultural Working Vehicle Wheel," filed Oct. 4, 2021, which is hereby incorporated by reference in its entirety.

FIELD OF THE INVENTION

The present subject matter refers generally to agricultural applicators and, more particularly, to a height control system in relation to ground of a protective frame for working vehicle wheel for an agricultural applicator.

BACKGROUND OF THE INVENTION

Various types of agricultural work vehicles use applicators (e.g., sprayers, floats, etc.) to deliver an agricultural substance (e.g., fertilizer, pesticides, herbicides, or other products) to a ground surface of a field. The ground surface may include an earth material that supports one or more objects (e.g., crops) extending therefrom. The agricultural applicator may include a bar assembly configured to facilitate product delivery over wide ranges of the field.

In parallel, working vehicles that need to move between crops, especially the applicators, need to have a suspension system, which opening and closing movement allows the absorption of terrain unevenness, in order to allow the height adjustment of the vehicle in relation to the ground and, thus, not transmitting the oscillations to the suspended mass of the vehicle to prevent that the passage of the vehicle damages the plantation and prevent that the structure is damaged by impacts with the ground.

In this line, to prevent the wheels of working vehicles from damaging the crops during their operation, a protective frame for the wheels is commonly used, commonly known as a "crop shield" or "open lines", which consists of an element that is coupled in front of a wheel (in relation to the direction of travel of the vehicle) of a working vehicle. These frames aim to protect agricultural crops, arranged in cultivation lines, so that they are not run over or damaged by the vehicle's wheels during their operation. The frames open the way between the cultivation lines, pushing aside the branches and branches of agricultural crops that are eventually projected into the space between the cultivation lines.

It turns out that, depending on the height of the suspension, the solutions of wheel protectors of the state of the art tend to print the oscillation of the height of the suspension at the relative height of the wheel protective frame in relation to the ground, which can result in several drawbacks, since the height of the suspension may not be maintained throughout the travel path of the vehicle through the planting and, consequently, cause damage to the planting, or even imply into collision of the line opener with the ground, damaging the component.

An example of the prior art solution, comprising the damping system coupled together with the center of the wheels as depicted in FIGS. 3A and 3B comprises the protective frame coupled to the leg structure, of the suspended mass (upper cast), which joins the suspension system to the vehicle structure, thus the protective frame has its height relative to the ground varying between a height H1, when the suspension is fully lowered, and H2, when the suspension is fully elevated.

Another solution of the state of the art, represented in FIGS. 4A and 4B, comprises the wheel protective frame associated with the lower casting (structure of the non-suspended mass), mounted next to the center of the wheel. In this solution, in addition to also occurring a height oscillation of the protective frame relative to the ground (ranging between a height H3 when the suspension is fully lowered, and H4 when the suspension is fully elevated), there is also a variation of inclination of the frame relative to the ground (ranging from an angle A when the suspension is fully lowered, and an angle B when the suspension is fully elevated). This inclination occurs due to the fact that the lower cast is supported along the axis of rotation of the wheel and the damping elements are mounted misaligned with respect to the center of rotation of the wheel, so that the lower cast pivots at the pivot point as the damping elements are actuated, impacting the rotation of the lower cast and, consequently, rotation of the protective frame. In this case, the risk of damage to the planting is increased due to the oscillation of height and inclination of the protective frame in relation to the ground, since the ideal parameters of planting opening are not maintained.

Accordingly, a system that maintains the position of a wheel protective frame for a working vehicle, regardless of the height variation of the suspension, is desired.

BRIEF DESCRIPTION OF THE INVENTION

The aspects and advantages of the invention will be set forth in part in the following description, or may be obvious from the description, or may be learned through practice of the invention.

In some embodiments, the present subject matter refers to a protective frame position control system for working vehicle wheel. The working vehicle comprising wheels and a suspension system connecting the wheels to the vehicle structure. The suspension system comprises an upper cast (suspended mass structure), which is associated with the vehicle structure, and a lower cast (non-suspended mass structure) which houses a damping element, the lower cast being pivotable relative to the axis of a pivot pin joining the upper cast (suspended mass structure) and the lower cast, and the damping element comprises a first end associated with the lower cast and a second end associated with the upper cast. Further, the system comprises a wheel protective frame mounted on the wheel and comprises at least one bearing aligned with the center of rotation of the vehicle wheel and a position guide that is associable with the upper cast and comprises a geometry oriented vertically and compatible with the path traveled by the first end of the damping element, between the fully elevated and fully lowered condition of the vehicle suspension.

According to further or alternative embodiments of the present invention, the following characteristics, and possible variants thereof, may also be present, alone or in combination:

- the system comprises a first bearing and a second bearing, disposed on opposite faces of each wheel;
- the association of the position guide with the upper casting occurs by housing a pin in the position guide, wherein the pin is associated with the upper casting and the position guide is associated to the protective frame and defined by a channel of cooperative geometry with the pin;

the geometry of the position guide is defined such that the reaction force generated between the pin and the wall of the position guide is perpendicular to the tangential contact surface of the pin within the position guide;

the geometry of the position guide is defined by an arc;

the system comprises a protective seal covering the region of the position guide in which the displacement of the pin occurs;

the portion of the pin sliding in the guide comprises a sliding element;

the sliding element is a bearing;

the first bearing and the second bearing each comprise: a shaft support associated to the wheel; a shaft comprising a first portion associated with the shaft support and a second portion associated to an outer body via a bearing; the outer body housing the bearing and comprising an outer cap closing a first end of the outer body and a bearing seal ring and a protective cap closing a second end of the outer body, the outer body being associated with the protective frame.

These and other aspects, functions and advantages of the present invention will be better understood by reference to the following description and appended claims. The accompanying drawings, which are incorporated in and constitute a part of this specification, illustrate the embodiments of the invention and, together with the description, serve to explain the principles of the invention.

BRIEF DESCRIPTION OF THE FIGURES

A complete and enabling description of the present invention, which includes its best mode, directed to a person of ordinary skill in the art, is set forth in the specification, which makes reference to the accompanying drawings, in which:

FIGS. 10A, 10B and 100 illustrate a detailed view of the wheel hub of an embodiment of the present invention, in a mounting sequence with the frame structure of the wheel guard frame, in the inwardly facing portion of the wheel of the vehicle;

FIGS. 24 and 25 illustrate, respectively, the positioning of the wheel protective frame, in the suspension height conditions represented in FIGS. 22 and 23, the height in relation to the ground being maintained in the two conditions.

DETAILED DESCRIPTION OF THE INVENTION

Figure 1:
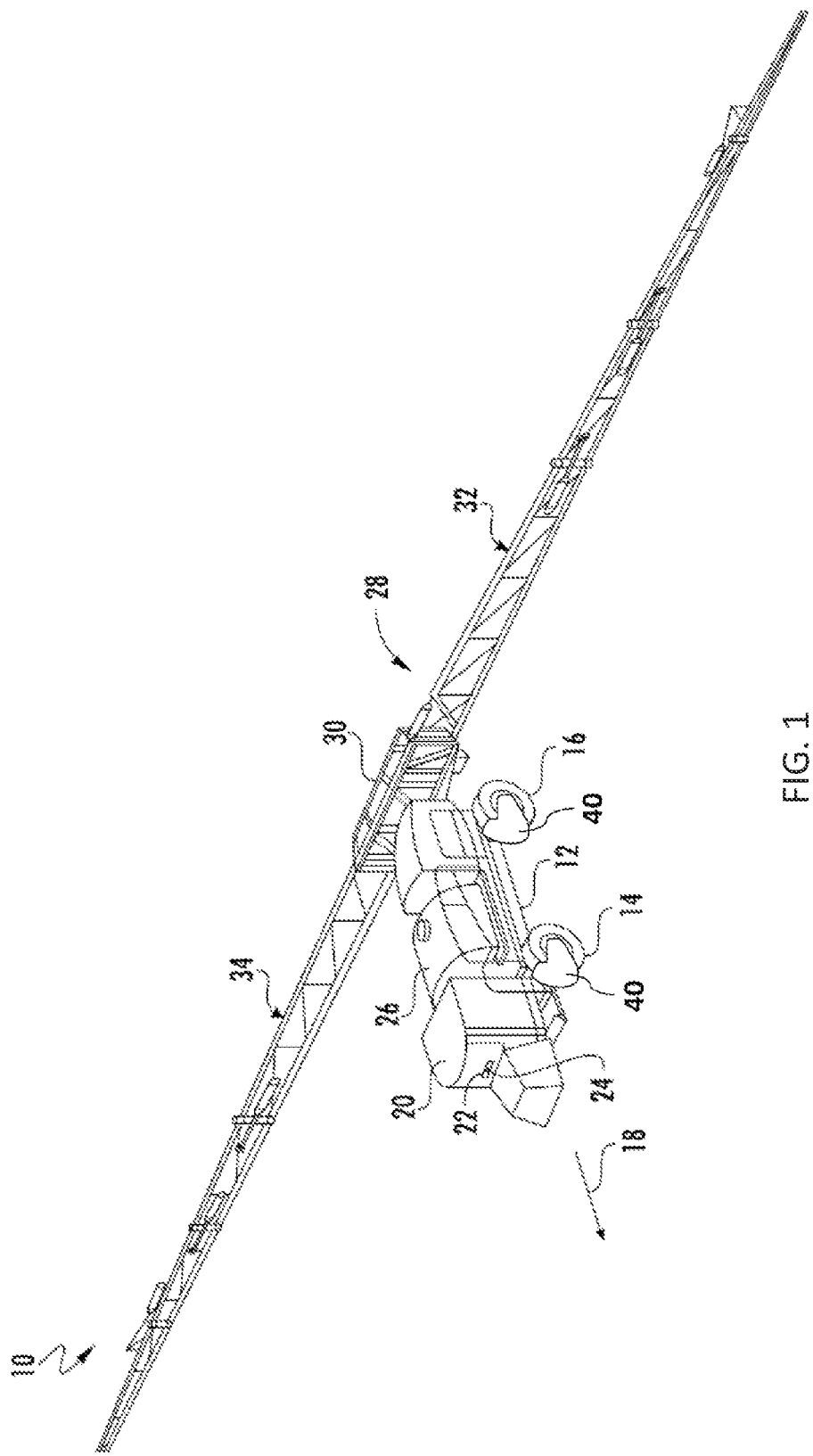
FIG. 1 illustrates a perspective view of an embodiment of a working vehicle according to aspects of the present subject matter.

Reference will now be made in details to the embodiments of the invention, one or more examples of which are illustrated in the drawings. Each example is provided by way of explanation of the invention, without limitation of the invention. Indeed, it will be apparent to those skilled in the art that various modifications and variations may be made in the present invention, without departing from the scope or spirit of the invention. For example, the functions illustrated or described as part of some embodiments may be used with another embodiment to further produce an additional embodiment. Accordingly, the present invention should encompass such modifications and variations as they are presented within the scope of the appended claims and their equivalents.

In the present document, relational terms, such as first and second, upper and lower, and the like, are used only to distinguish one entity or action from another entity or action without necessarily requiring one to imply any actual relationship or order between such entities or actions. The terms "comprises," "comprising," or any other variation thereof, shall encompass a non-exclusive inclusion such that a process, method, article, or apparatus comprising a list of elements does not include only those elements but includes other elements not expressly listed or inherent to such process, method, article, or apparatus. An element preceded by "comprises . . . a" does not, without further restrictions, prohibit the existence of additional identical elements in the process, method, article, or apparatus comprising the element.

For the purposes of the present invention, "associated" means any form of integration of one component with another, which may be directly or by means of permanent (welding, glue, among others) or non-permanent (screws, fittings, locks, among others) fastening means.

As used herein, the term "and/or," when used in a list of two or more items, means that any of the listed items may be employed by itself or any combination of two or more listed items may be employed. For example, if a composition or assembly is described as containing components A, B, and/or C, the composition or assembly may contain only A; only B; only C; A and B in combination; A and C in combination; B and C in combination; or A, B, and C in combination.

Generally speaking, the present subject matter relates to a system for controlling the position of a vehicle wheel protective frame that is capable of ensuring that the height and inclination of the wheel protective armature with respect to the ground is maintained, regardless of the height of the vehicle suspension, depending on the type of planting, or the ground oscillations or load difference on one side of the vehicle.

Figure 2:
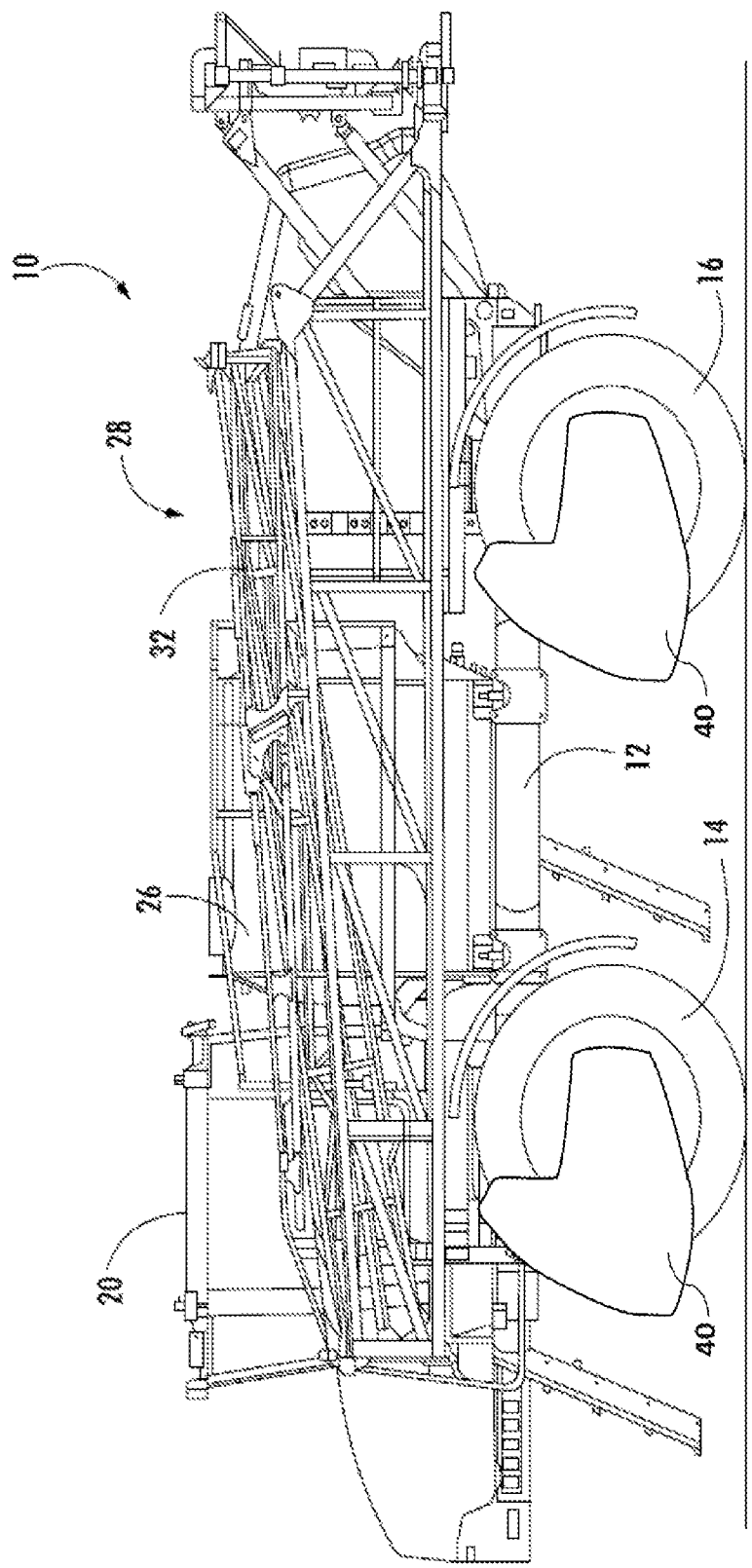
FIG. 2 illustrates a side view of an agricultural applicator according to aspects of the present subject matter; illustrating in particular a configuration with the protective frame mounted on the wheel of the vehicle according to aspects of the present subject matter.
Figure 3A:
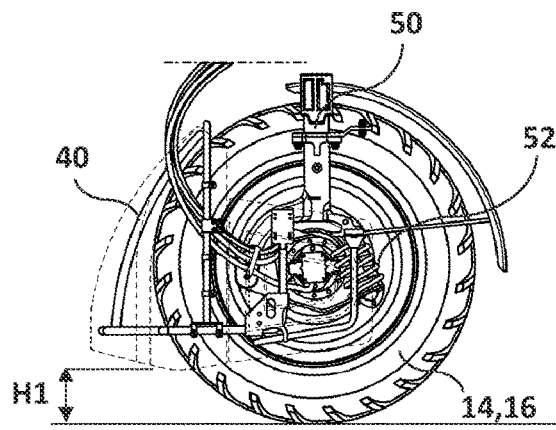
FIGS. 3A and 3B illustrate a side view of a prior art solution in which the wheel protective frame is fixed in the upper casting, so that the height of the protective frame relative to the ground changes as a result of the height of the suspension of the vehicle.
Figure 3B:
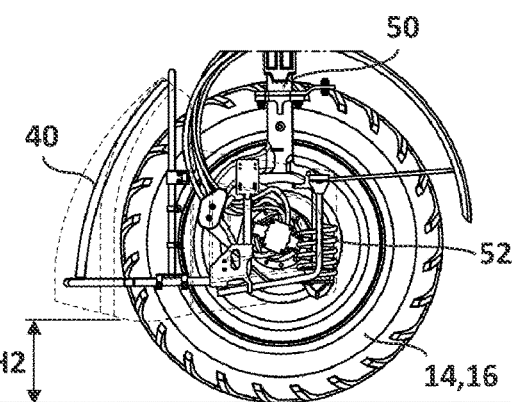
Figure 4A:
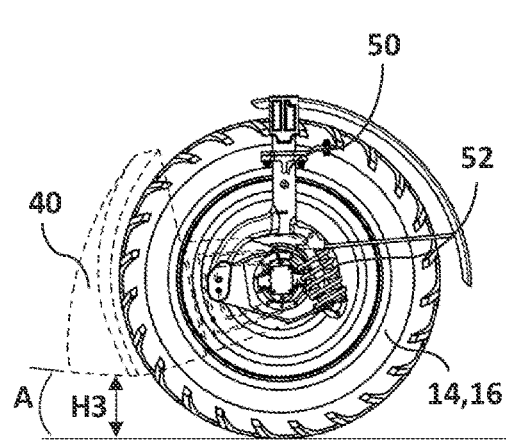
FIGS. 4A and 4B illustrate a side view of a solution of the prior art in which the wheel protective frame is fixed in the lower casting arranged in the central region of the wheel, so that the protective frame has its height and inclination in relation to the ground changed due to the height of the suspension of the vehicle.
Figure 4B:
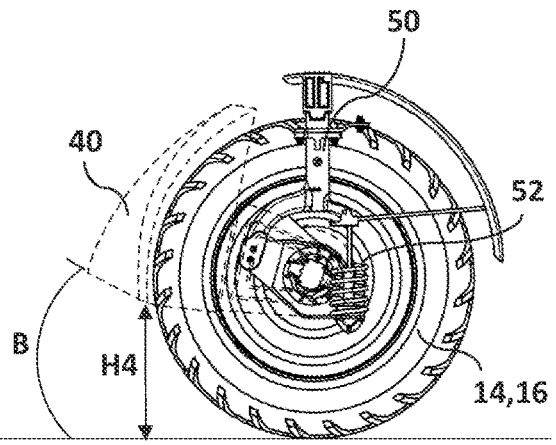

Referring now to FIGS. 1 and 2, a working vehicle 10 is configured as a self-propelled agricultural applicator. However, in alternative embodiments, the working vehicle 10 may be configured as another suitable type of working vehicle 10 configured to perform agricultural application operations, such as a tractor or other vehicle configured to transport or tow an application implement.

In various embodiments, the working vehicle 10 may include a chassis 12 configured to support or couple to a plurality of components. For example, the front and rear wheels 14, 16 may be coupled to the chassis 12. The wheels 14, 16 may be configured to support the working vehicle 10 relative to a ground surface and move the working vehicle 10 in a travel direction (e.g., as indicated by arrow 18 in FIG. 1) in a field or on the ground surface. Accordingly, the working vehicle 10 may include a power unit, such as a motor, a driving machine, or a hybrid motor-driving machine combination, for moving the vehicle 10 along the field. In some instances, the working vehicle 10 may also include a transmission configured to transmit power from the engine to any of the wheels 14, 16.

The chassis 12 may also support an operator station 20, such as a cabin, that provides various control or input devices (e.g., levers, pedals, control panels, buttons, and/or the like) to allow an operator to control the operation of the working vehicle 10. For example, as shown in FIG. 1, the working vehicle 10 may include a human-machine interface (HMI) 22 to display messages and/or alerts to the operator and/or to allow the operator to interface with the vehicle controller. In some embodiments, the HMI 22 may include one or more user input devices 24 in the form of switches, knobs, rotary knobs, and/or any other device that allows the operator to provide user inputs to the controller.

In addition, the chassis 12 may also support a tank 26 and a bar assembly 28 mounted to the chassis 12. The tank 26 is generally configured to store or retain an agricultural substance, such as a pesticide, a fungicide, a rodenticide, a fertilizer, a nutrient, and/or the like. The agricultural substance stored in the tank 26 may be dispensed onto the underlying ground surface (e.g., plants and/or ground) via the one or more dispensers (such as, nozzles) mounted on the bar assembly 28.

As shown in FIGS. 1 and 2, the bar assembly 28 may include a frame that supports the first and second bar arms 32, 34 in cantilever. The first and second bar arms 32, 34 are generally movable between an operational or unfolded position (FIG. 1) and a non-operational or folded position (FIG. 2). During product dispensing, the first and/or second bar arms 32 34 extend laterally outward from the working vehicle 10 in order to cover wide ground application ranges, as illustrated in FIG. 1. However, in order to facilitate transport, each bar arm 32, 34 of the bar assembly 28 may be independently folded back or forth in the non-operational position, thereby reducing the overall width of the vehicle 10 or, in some examples, the overall width of a towable implement when the applicator is configured to be towed behind the working vehicle 10.

It can also be seen from FIGS. 1 and 2 that the wheel protective frame 40 mounted on the front 14 and/or rear 16 wheels of the vehicle 10 protects the front portion of the wheels, relative to the travel direction (18), so as to open the passage track of the vehicle 10 and thus prevent (or at least decrease) the amount of plants that can tangle on the wheels, reducing the amount of losses resulting from damage to part of the plantation whenever the vehicle 10 needs to transit over the growing region.

Figure 5:
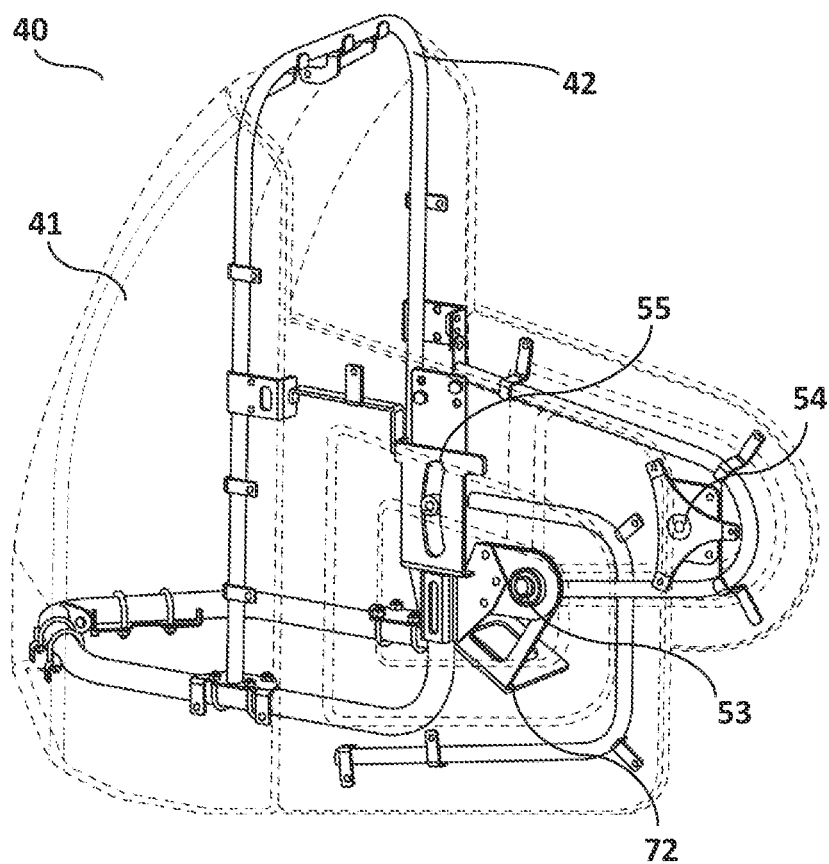
FIG. 5 illustrates a rear perspective view of the wheel protective frame, according to an embodiment of the present invention, showing the face that is inwardly facing, when the protective frame is mounted on the vehicle.

Referring to FIG. 5, a rear perspective view of the wheel protective frame 40 as an embodiment of the present invention is presented. It is possible to observe that the wheel protective frame 40 comprises an outer enclosure 41 and an inner frame 42, which confers rigidity to the protective frame 40 and supports the fastening regions of the wheel protective frame 40 with the wheel 14,16 of the vehicle 10. Specifically in this embodiment of the present invention, the inner structure 42 comprises at least one bearing 53,54, the embodiment illustrated in FIG. 5 comprising a first bearing 53 and a second bearing 54, which are concentric with each other and arranged one on each side of the wheel protective frame 40, i.e. when the wheel protective frame 40 is mounted on the wheel 14,16, the first bearing 53 faces the inner face of the vehicle 10 and the second bearing 54 faces the outer face of the vehicle 10.

The first bearing 53 and the second bearing 54 are associable with the axis of rotation of the wheel 14,16 so that centering of the protective frame 40 with the wheel 14,16 is ensured. Additionally, the inner structure 42 comprises a position guide 55 that is associable with the structure of the vehicle 10, as will be detailed below.

It should be noted that, in alternative configurations of the present invention, the wheel protective frame 40 may be defined solely by the inner structure 42 (hollow structure), the outer enclosure 41 (closed structure) or by a combination of the inner structure 42 with the removable outer enclosure 41. Thus, the present invention requires at least that the protective frame 40 comprises the bearings 53, 54 and the position guide 55 in order to achieve the technical feature claimed herein.

Figure 6:
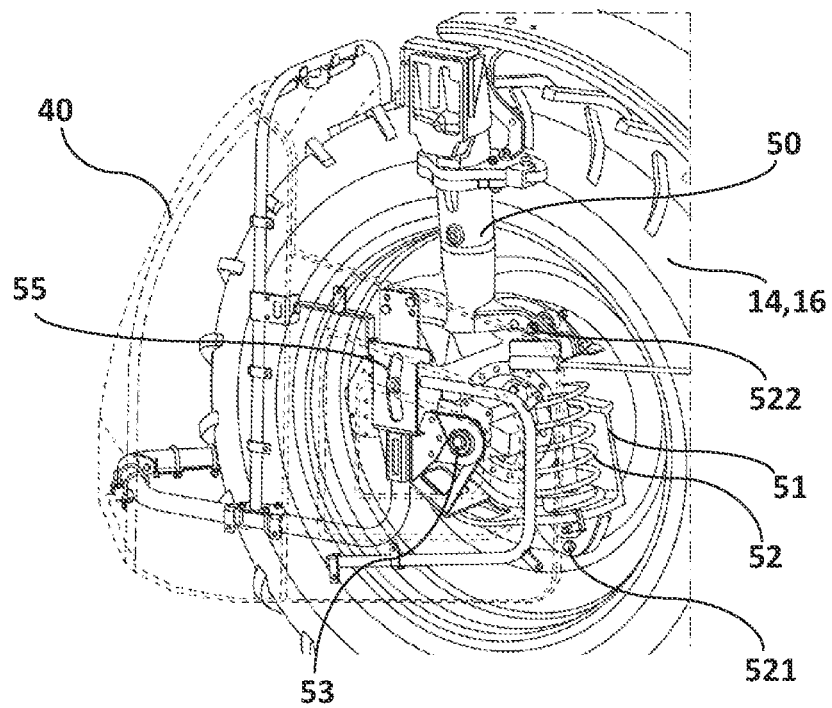
FIG. 6 illustrates a rear perspective view of the wheel protective frame, according to an embodiment of the present invention, mounted on the vehicle wheel and showing the face that is inwardly facing when the protective frame is mounted on the vehicle.

In FIG. 6, a view of the protective frame 40 is depicted, observed from the same angle as the representation shown in FIG. 5, however FIG. 6 illustrates the protective frame 40 mounted on the wheel 14,16, being possible to observe that the wheel 14,16 comprises a damping system disposed at its central portion. In particular, it is possible to observe that the central portion of the wheel 14,16 comprises a lower cast 51 that holds a damping element 52, wherein the damping element 52 has its first end 521 associated with the lower cast 51 and a second end 522 associated with an upper cast 50, which is joined to the vehicle structure 10. Thus, the damping element 52 is responsible for performing suspension control between the vehicle structure 10 and the wheels 14,16. As an example, said association of the first end 521 of the damping element 52 with the lower cast 51, as well as the association of the second end 522 of the damping element 52 with the upper cast 50 may be accomplished by any means known in the art that enables full operation of the suspension system, for example by means of joints with hinged eyebolt, ball joint, angular joint, yokes, among others of the prior art.

It should be noted that, for the purposes of the present invention, damping element 52 is understood as any type of component or set of components known in the art that have the function of supporting a vehicle on the wheels, establishing the distance between the floor of the vehicle and the ground, in addition to providing the absorption of soil irregularities during running of the vehicle. Thus, the damping element 52 may be of various types, such as: springs; spring-damper assemblies; air pockets; pneumatic or hydraulic pistons; or even the combination thereof.

Figure 7:
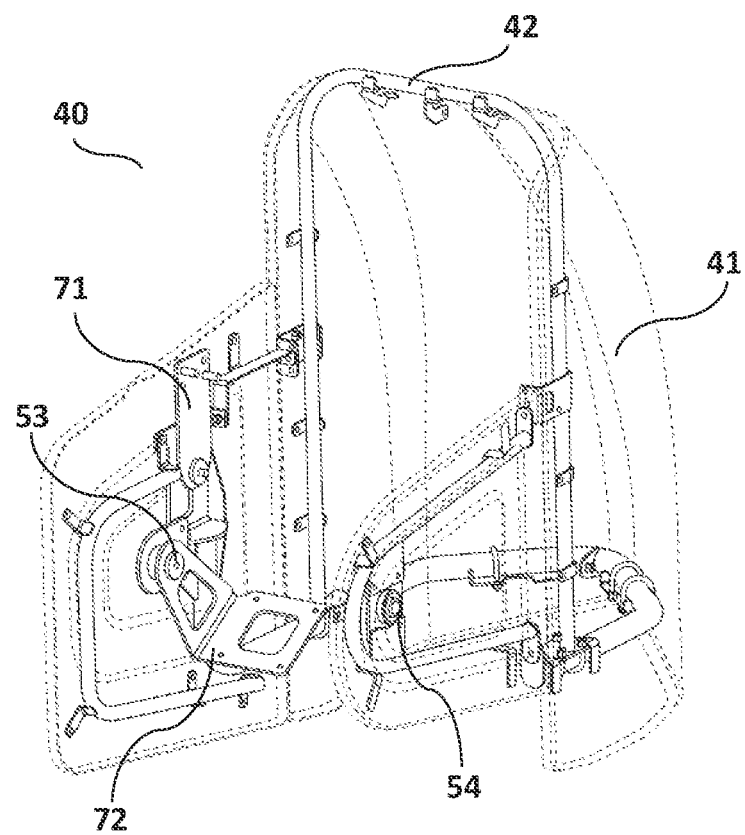
FIG. 7 illustrates a rear perspective view of the wheel protective frame, according to an embodiment of the present invention, showing the face that is outwardly facing, when the protective frame is mounted on the vehicle.

In FIG. 7, it is possible to observe the wheel protective frame 40, according to the embodiment shown in FIG. 5, however illustrating the face that will face outwardly of the vehicle 40 when it is mounted on the wheel 14,16. In FIG. 7 it is possible to observe a supporting rod 72 whose main function is to provide the association of the first bearing 53 with the lower cast 51 of the suspension system, as will be better detailed below.

Figure 8:
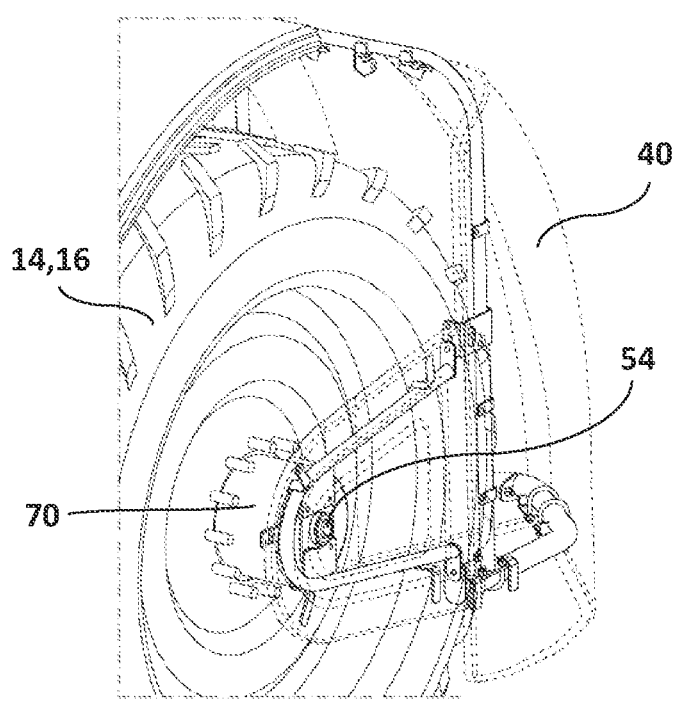
FIG. 8 illustrates a rear perspective view of the wheel protective frame, according to an embodiment of the present invention, mounted on the vehicle wheel and showing the face that is outwardly facing when the protective frame is mounted on the vehicle.

FIG. 8 depicts the wheel protective frame 40 under the same angle as FIG. 7, however in the condition in which the wheel protective frame 40 is mounted on the wheel 14,16, where it is possible to view the assembly of the second bearing 54 concentrically to the wheel hub 70 of the wheel 14,16.

Figure 9A:
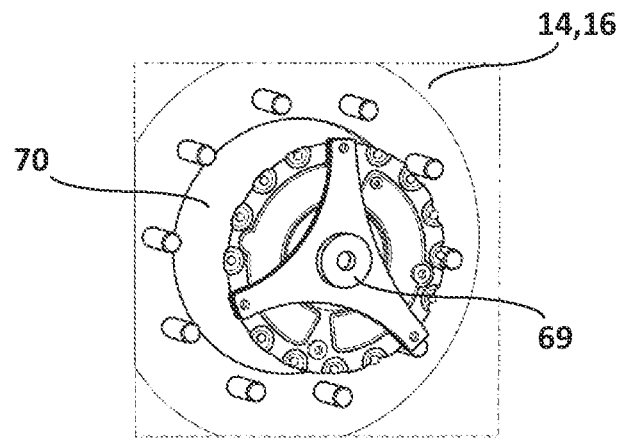
FIGS. 9A, 9B and 9C illustrate a detailed view of the wheel hub of an embodiment of the present invention, in a mounting sequence with the frame structure of the wheel protective frame, in the portion of the wheel outwardly facing the vehicle.
Figure 9B:
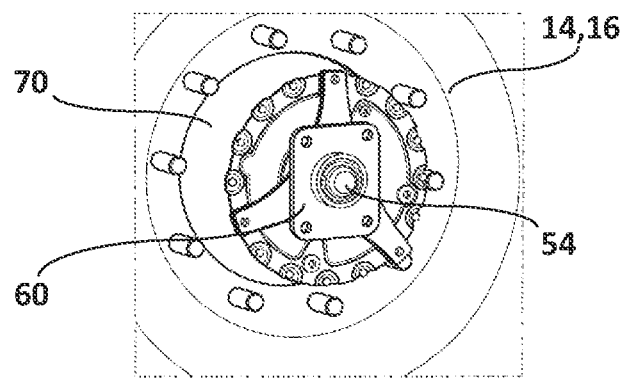
Figure 9C:
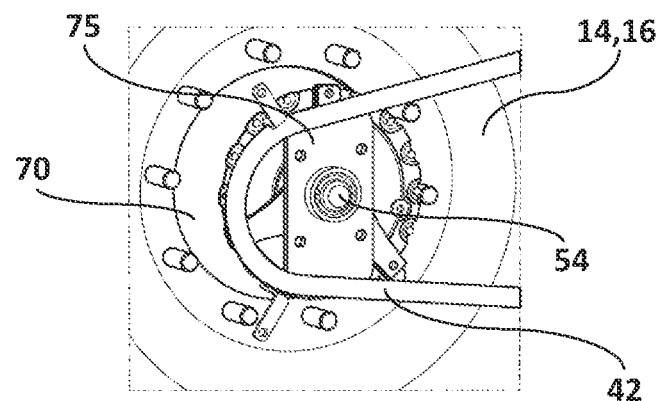

FIGS. 9A, 9B and 9C depict the steps of assembling the second bearing frame 54 on the wheel hub 70. In FIG. 9A a plate with the axle support 69 is associated with the wheel hub 70. FIG. 9B illustrates a next step, in which the outer body 60 is assembled and defines the second bearing 54, and in FIG. 9C, in a next step, shows the bearing 54 being associated with the frame 42 of the protective frame 40 by means of a fastening plate 75 that joins the frame 42 and the outer body 60.

Figure 10A:
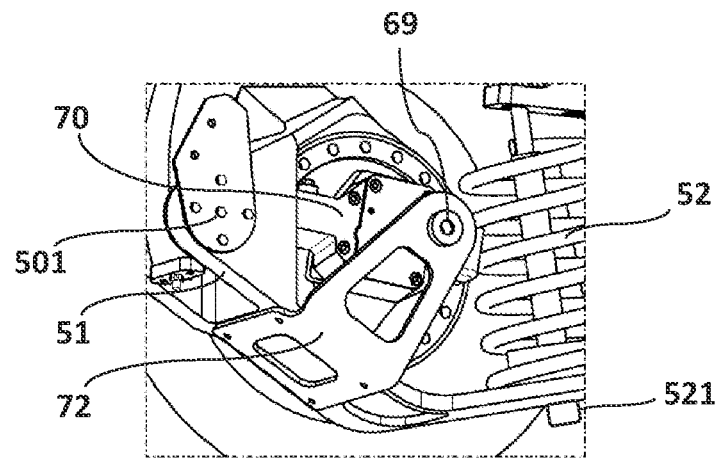
Figure 10B:
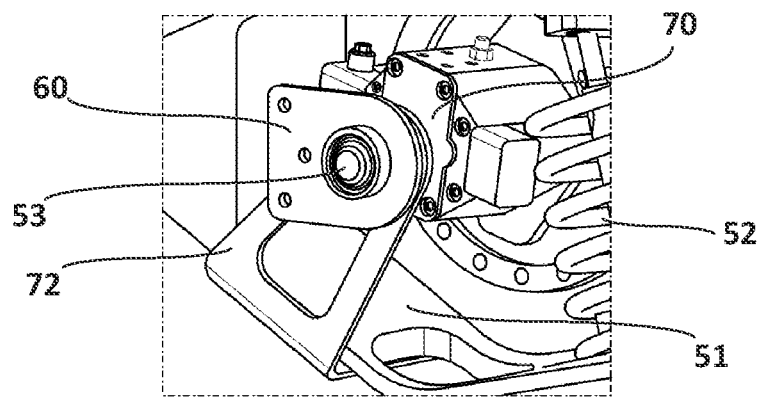
Figure 10C:
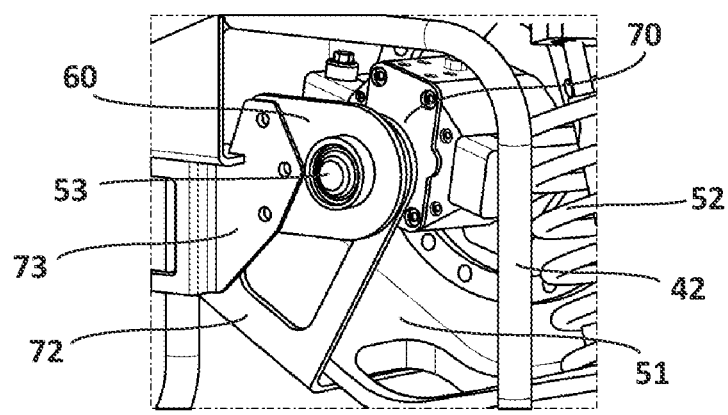

In FIGS. 10A, 10B and 10C, steps of assembling the first bearing frame 53 to the frame 42 of the wheel protective frame 40 are depicted. In FIG. 10A, the frame 72 is attached to the lower cast. It is noted that the frame 72 comprises the shaft support 69. In FIG. 10B, the outer body 60 is mounted on the frame defining the bearing 53, and finally in FIG. 100 the bearing 53 is represented being associated with the frame 42 of the protective frame 40, by means of the union between the outer body 60 with an attachment surface 73 of the frame 42.

Figure 11:
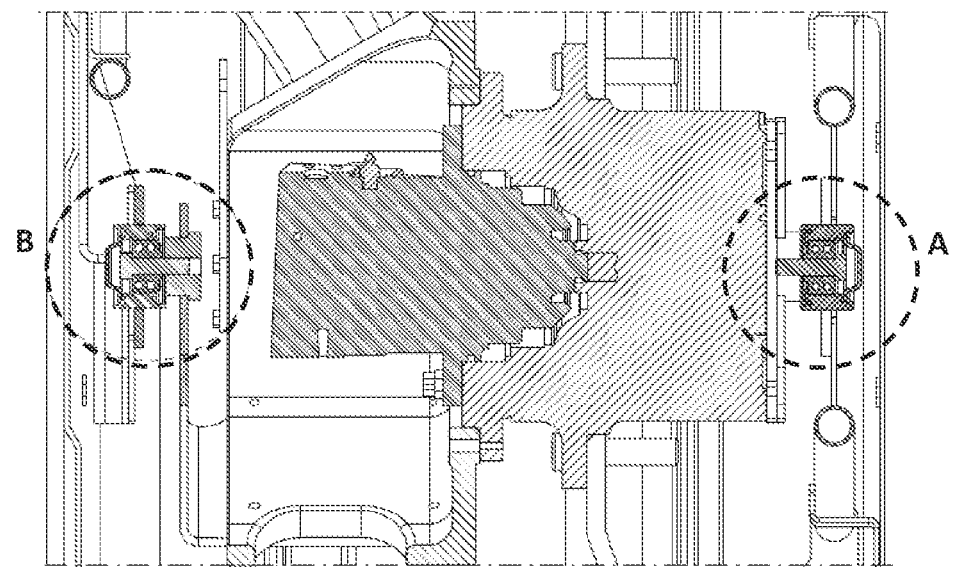
FIG. 11 is a sectional view of the vehicle wheel, illustrating the wheel protective frame mounting bearings.

Referring to FIG. 11, a cross-sectional view of the wheel 14,16 is depicted, highlighting in details A and B the mounting regions of the first bearing 53 and the second bearing 54. Details A and B are represented, respectively, in FIGS. 12 and 13.

Figure 12:
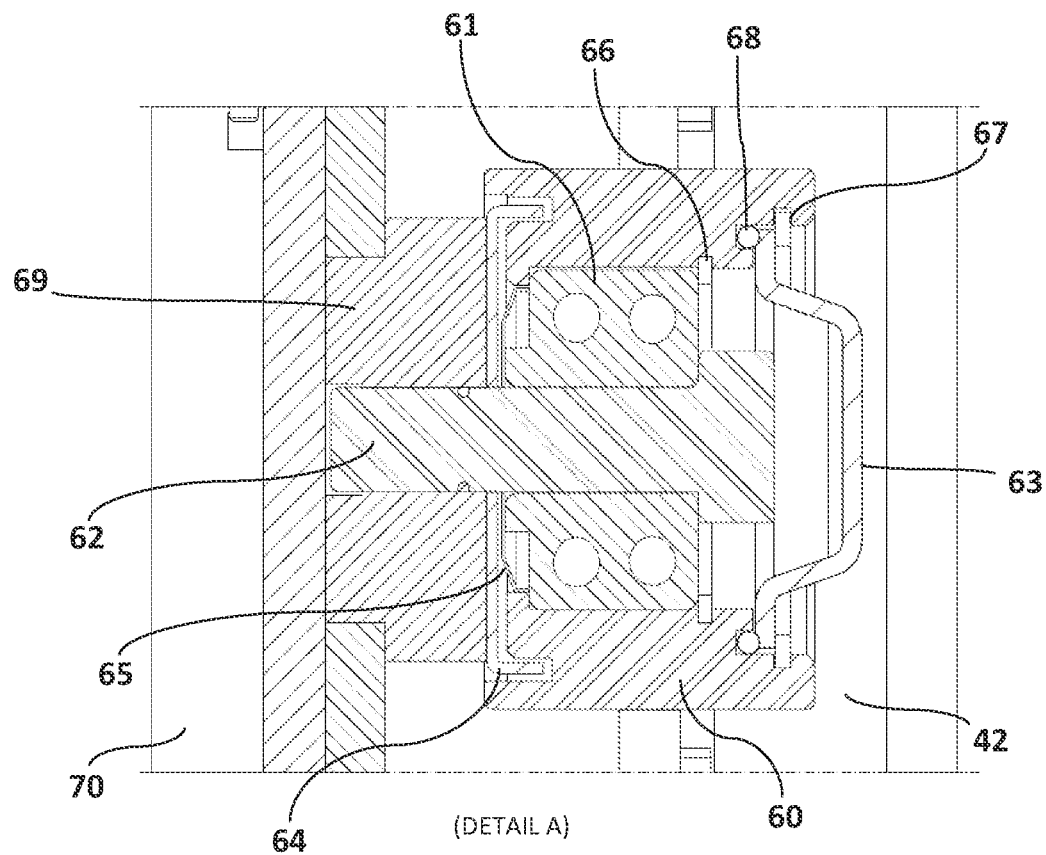
FIG. 12 is an enlarged view of detail A, illustrated in FIG. 11.
Figure 13:
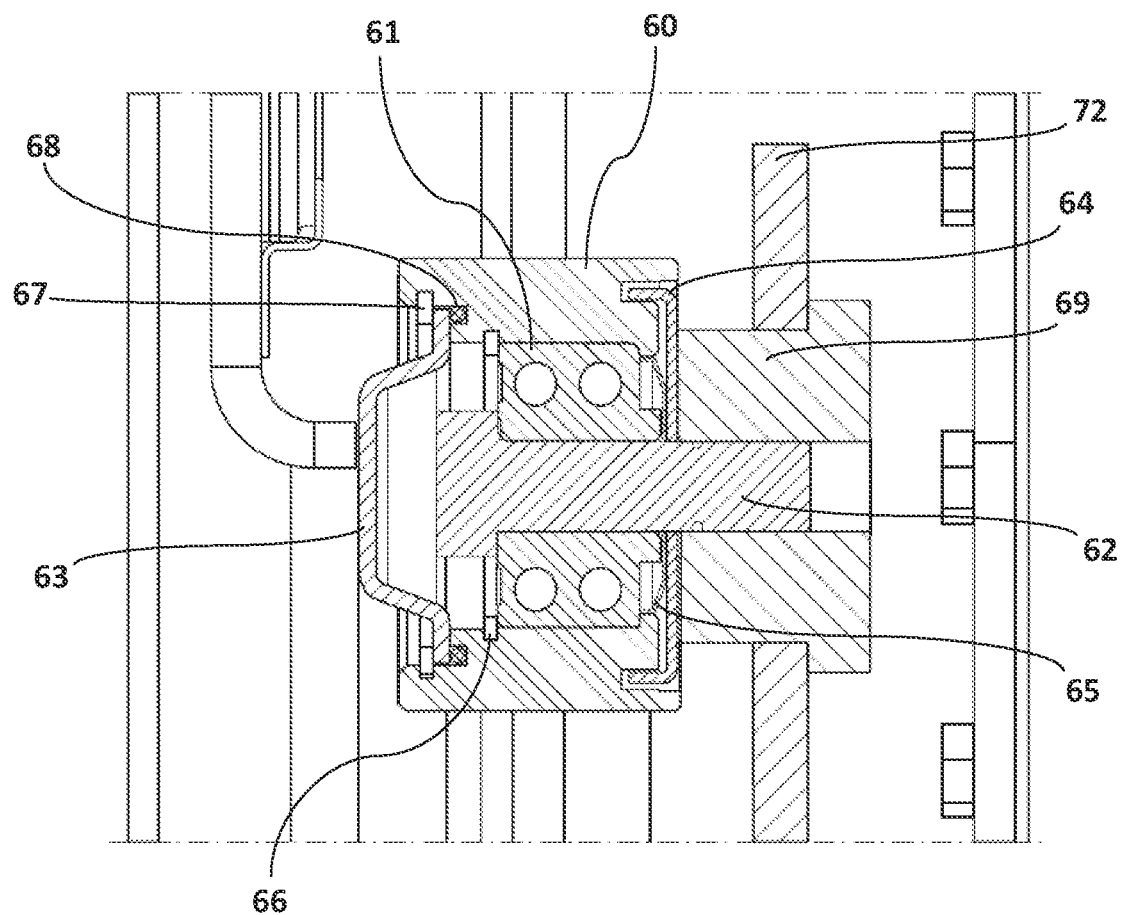
FIG. 13 is an enlarged view of detail B, illustrated in FIG. 11.

It is possible to observe from FIGS. 12 and 13 that the internal constructive arrangement of the first bearing 53 and the second bearing 54 are similar, since both comprise a shaft support 69 that is associated with the wheel structure 14,16, said shaft support 69 being associated with a first end of a shaft 62. The shaft 62 comprises a second end associated with a bearing 61. Such a bearing 61, in the embodiment depicted in FIGS. 11 to 13 is a ball bearing, however any other bearing means for a shaft, which is known in prior art, may be employed.

The bearing 61, in turn, is also associated with an outer body 60, which completely surrounds and protects the bearing 61 and the second end of the shaft 62. The bearing 61 has its displacement locked relative to the outer body 60 by means of an elastic ring 66. To protect the bearing region 61 from moisture or dirt contamination and thus preserve the integrity and service life of the bearing 61, the outer body 60 comprises an outer cap 63 that closes the opening of the outer body 60 facing to the direction opposite to the wheel 14,16. The outer cap 63 has its edge sealed by means of a sealing ring 68 and is held locked in position by means of an elastic ring 67.

On the opposite face of the outer body 60, i.e., the wheel-facing face 14,16, a seal is employed by means of a bearing seal ring 65, such as a Nilos ring, mounted concentric to the shaft, in addition to the use of a protective cap 64, which covers the seal ring 65.

Figure 14:
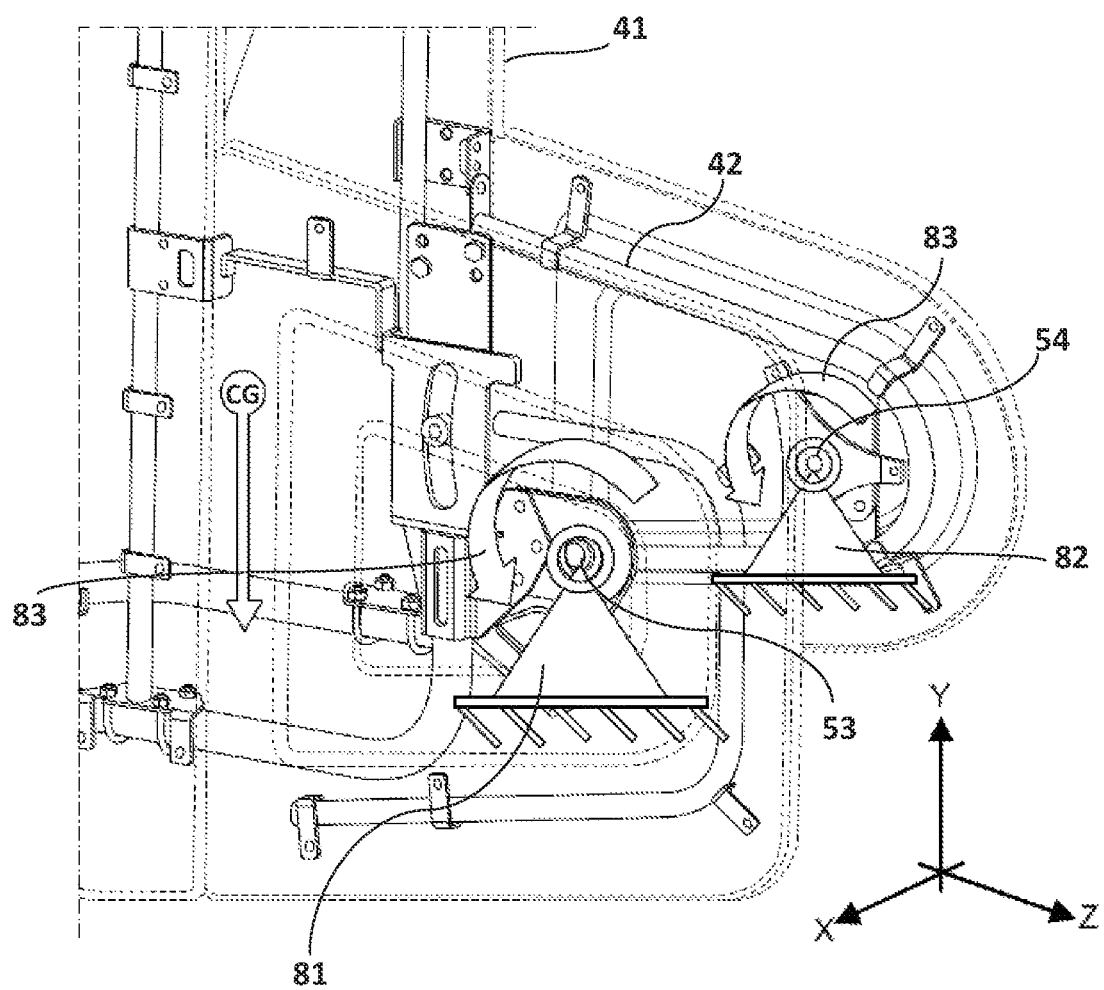
FIG. 14 illustrates a rear perspective view of an embodiment of the wheel protective frame of the present invention, indicating its supports and degrees of freedom, when associated with the wheel of the vehicle.

In FIG. 14, the degrees of freedom of the protective frame 40 with respect to the vehicle structure 10 that the present invention aims to solve are depicted. Specifically, the first bearing 53 and the second bearing 54, mounted concentrically to the axis of rotation of the wheel 14,16, define the bearing points 81 and 82. The mounting of the first bearing 53 on the inner face of the wheel 14,16 and the mounting of the second bearing 54 on the outer face of the wheel 14,16 causes the protective frame 40 to comprise a single degree of freedom of rotation 83 free, relative to the structure of the vehicle.

Considering that the wheel 14,16 remains in constant rotation during operation of the vehicle, it is evident that the locking of the degree of freedom 83 cannot be obtained from the association of the protective frame 40 with the components mounted inside the wheel. Thus, an association of the frame 40 with part of the vehicle structure is performed. Considering that the distance between the vehicle structure 10 and the wheels 14,16 varies constantly due to the work of the suspension system, the present invention provides the use of an assembly capable of allowing the vertical displacement of the wheel 14,16 relative to the vehicle structure 10 and, at the same time, allowing the restriction of the degree of freedom 83 of rotation of the protective frame 40 relative to the vehicle structure 10.

A particular embodiment of the present invention, represented in detail in FIGS. 15 to 23, consists of the use of a guide 55 on the frame 42 of the protective frame 40, wherein the guide 55 is associable with the upper cast 50 and comprises a geometry oriented vertically and compatible with the trajectory performed by the first end 521 of the damping element 52 between the conditions in which the suspension system is fully elevated and in the fully lowered.

As an example, said association of guide 55 with the upper cast 50 indicates that these parts are connected to each other in an interactive manner, such interaction may occur between the guide 55 with the upper cast 50, or by means of a pin 56 associated with a rod 71 attached to the upper cast 50, as clearly represented in FIGS. 15 to 17 and 20 to 25.

The geometry of the guide 55 is defined in such a way that it is able to absorb the displacement necessary to provide the vertical movement of the vehicle structure 10 relative to the ground when a change in the height of the suspension occurs. Specifically, the geometry of the guide 55 is defined such that the direction of movement is rotational, about a pivot point. This point is a pivot pin 501, shown in FIGS. 10A, 15, 16, 20, 22 and 23. However, the movement is "almost vertical", since the delimitation of the suspension movement comprises only the "almost vertical" portion (the arc) of the complete circle that would be the movement of point 521, for example.

Figure 22:
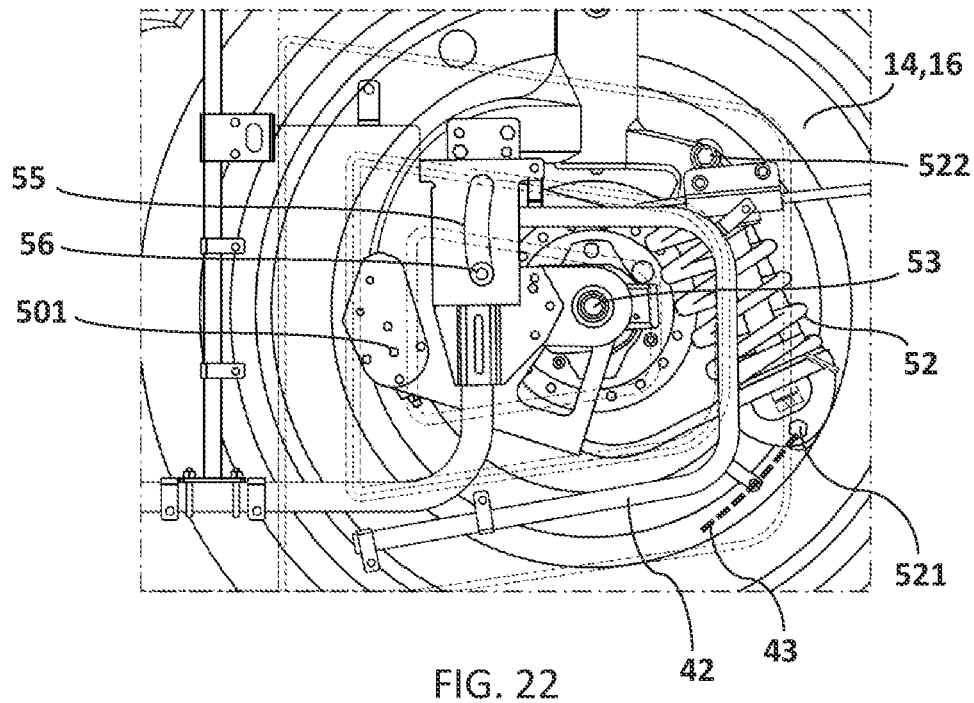
FIGS. 22 and 23 illustrate, respectively, the positioning of the guide pin slidably mounted on the guide, in the conditions in which the suspension is fully lowered and fully suspended.
Figure 23:
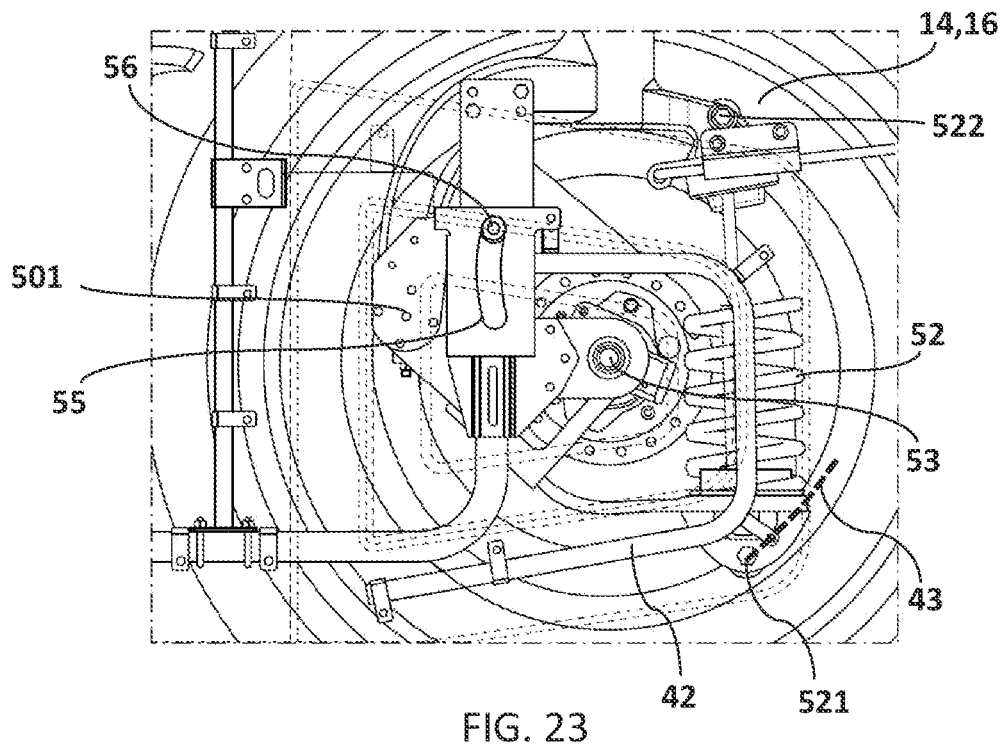

FIG. 22 shows the suspension system in the fully lowered condition and FIG. 23 shows the suspension system in the fully elevated condition. In FIGS. 22 and 23 it is also observed that the geometry of the guide 55 has its length equivalent to the geometry of the path 43 that is travelled by the first end 521. In one embodiment of the invention, the geometry of the guide 55 is defined by an arc.

In one embodiment of the present invention, the guide 55 is defined by a housing capable of receiving a pin 56 so as to enable sliding of the pin 56 within the guide 55 while the height of the suspension is changed. The pin 56 is cooperative with the upper cast structure 50, which in turn is cooperative with the vehicle structure 10. Thus, the pivoting displacement of the wheel 14,16, as a result of compensation for terrain irregularities, has the position of the frame 40 maintained in the same position relative to the wheels 14, 16 due to the displacement of the pin 56 within the guide 55, and the degree of freedom 83 of rotation of the protective frame 40 about the axis of rotation of the wheel 14,16 is prevented as a result of the support of the pin 56 on the walls of the guide 55. In particular, the reaction force generated between the pin 56 and the wall of the position guide 55 is perpendicular to the tangential contact surface of the pin 56 within the position guide 55. In one embodiment of the invention, the pin 56 comprises a sliding element 58 at the end that is housable in the guide 55 to facilitate sliding of the pin 56 in the guide 55. Such a sliding element 58 may be a polymeric composite ring or a bearing.

Figure 15:
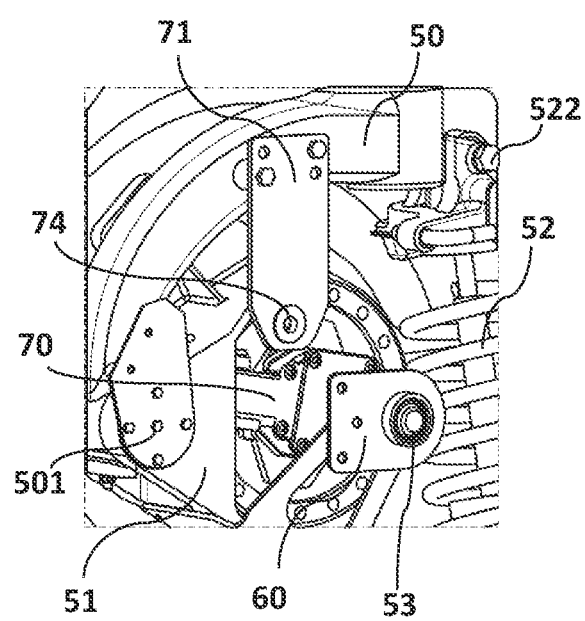
FIGS. 15 and 16 illustrate an assembly sequence of an embodiment of a positioning guide of the wheel protective frame of the present invention, which maintains the protective frame at the predefined inclination during the height change of the suspension of the vehicle.
Figure 16:
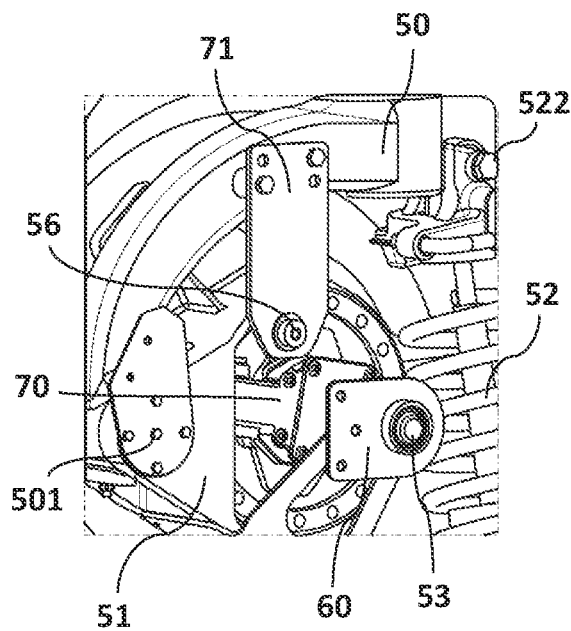
Figure 17:
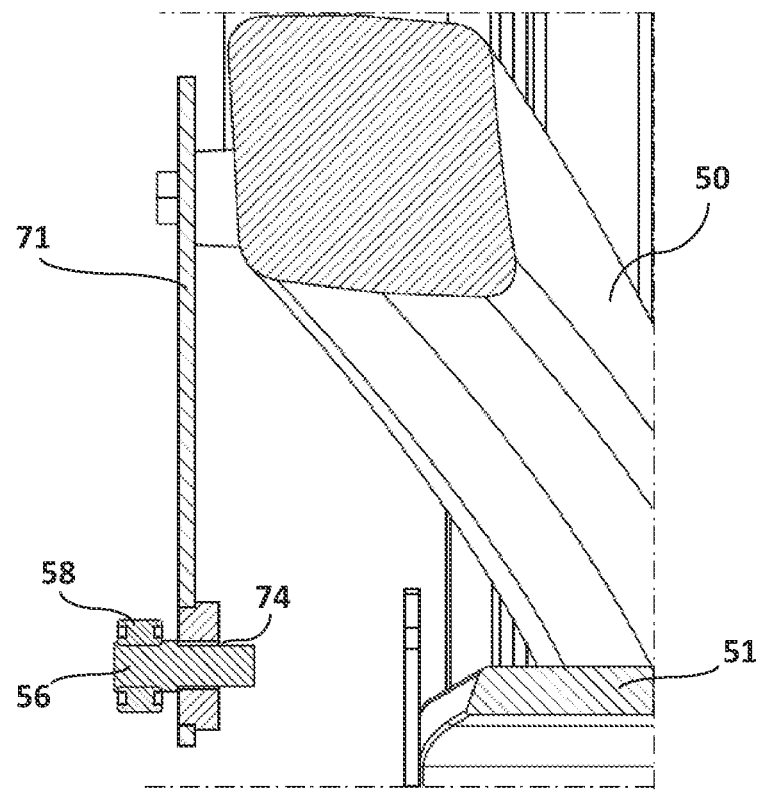
FIG. 17 is a detail sectional side view of the guide pin with bearing, responsible for the position slipping of the wheel protective frame observed in FIGS. 15 and 16.

FIGS. 15 and 16 illustrate steps of mounting the pin 56, and in FIG. 15 it is shown that a rod 71 has a first end associated with the upper cast 50 and has the second end provided with a hole 74 in which the pin 56 is mounted. FIG. 17 depicts a cross-sectional view of the rod 71 with the pin 56 mounted in the bore 74 and the sliding element 58 mounted on the free end of the pin 56.

Figure 18:
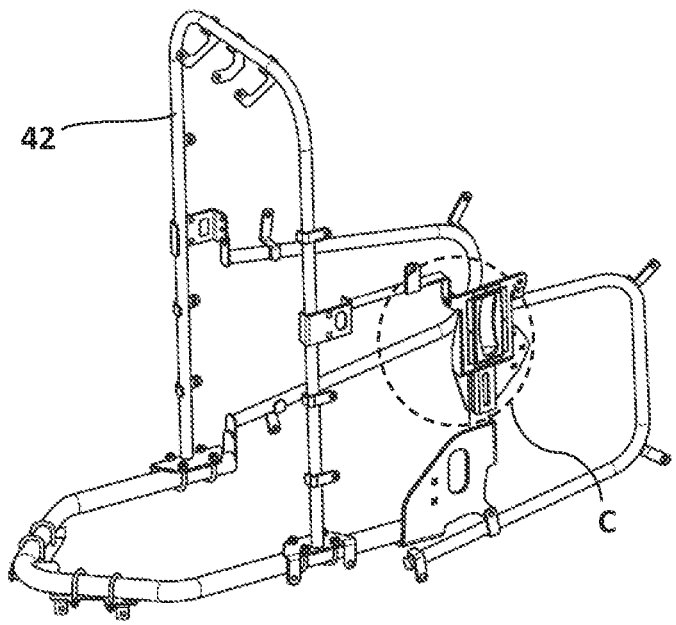
FIG. 18 is a perspective view of an embodiment of the wheel protective frame without the enclosure, including a guide for mounting the guide pin for positioning the protective frame.
Figure 19:
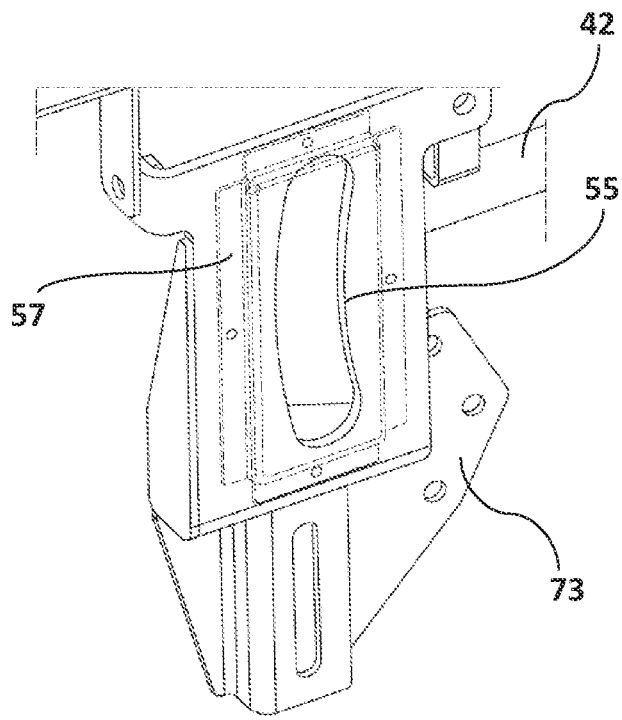
FIG. 19 is a detailed enlarged view of the guide depicted in FIG. 18.
Figure 20:
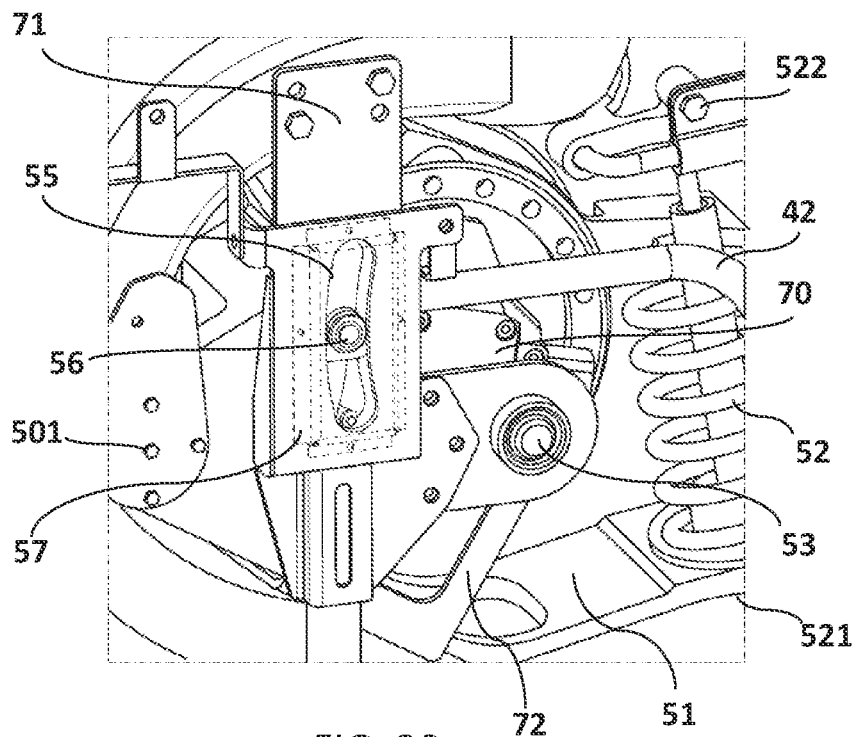
FIG. 20 is a detailed view of the positioning guide pin of the protective frame, depicted in FIGS. 16 and 17, mounted on the guide depicted in FIGS. 18 and 19.
Figure 21:
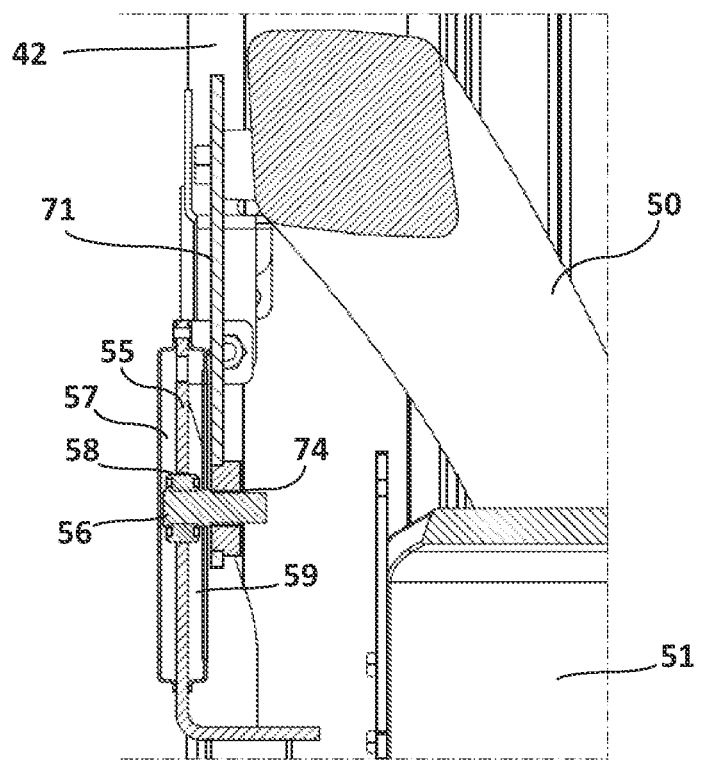
FIG. 21 is a sectional side view of the guide pin assembly for positioning the protective frame on the guide, as depicted in FIG. 20.

FIG. 18 depicts the structure 42 of the frame 40, representing in detail C the region in which the guide 55 is disposed. FIG. 19 shows detail C, in which it is possible to observe the guide 55 with a protection seal 57 covering the guide 55 entirely on the opposite face to that on which the pin 56 is mounted. FIG. 20 shows a detailed view of the guide 55, with the seal 57, in the condition in which the frame 42 is mounted on the wheel 14,16 and FIG. 21 represents a cross-sectional view of the rod 71 comprising the protection seal 57 and also showing an internal protection seal 59, with an opening only sufficient for passage of the pin 56, in order to allow its sliding within the guide 55.

Finally, FIGS. 24 and 25 depict the wheel protective frame position control system 40 depicted in the conditions in which the suspension is fully lowered and fully elevated, respectively. In both conditions, the inclination and height H of the protective frame 40 relative to the ground is maintained.

This written description uses examples to describe the invention, including the best mode, and also to enable any person skilled in the art to practice the invention, including producing and using any devices or systems and performing any incorporated methods. The patentable scope of the invention is defined by the claims, and may include other examples that occur to those skilled in the art. Such other examples are intended to fall within the scope of the claims if they include structural elements that do not differ from the literal language of the claims, or if they include equivalent structural elements with non-substantial differences from the literal languages of the claims.

The invention claimed is:

1. A protective frame position control system for an agricultural working vehicle wheel, the agricultural working vehicle comprising:
   a wheel;
   a suspension system connecting the wheel to a chassis of the agricultural working vehicle, wherein the suspension system comprises an upper cast joined with the agricultural working vehicle and a lower cast housing a damping element, the lower cast being pivotable about an axis of a pivot pin joining the upper cast and the lower cast, and the damping element comprising a first end associated with the lower cast and a second end associated with the upper cast; and
   a wheel protective frame mounted on the wheel, wherein the wheel protective frame comprises:
      at least one bearing aligned with a center of rotation of the wheel of the agricultural working vehicle; and
      a position guide capable of being associated with the upper cast, the position guide comprising a vertically oriented geometry and compatible with a path travelled by the first end of the damping element, between a fully elevated condition and a fully lowered condition of the suspension system.

2. The protective frame position control system of claim 1, wherein the at least one bearing comprises a first bearing and a second bearing disposed on opposite faces of the wheel.

3. The protective frame position control system of claim 1, wherein the association of the position guide with the upper cast occurs by housing a pin in the position guide, the pin is associated with the upper cast, and the position guide is associated with the protective frame and defined by a channel of cooperative geometry with the pin.

4. The protective frame position control system of claim 3, wherein the vertically oriented geometry of the position guide is defined such that a reaction force generated between the pin and a wall of the position guide is perpendicular to a tangential contact surface of the pin within the position guide.

5. The protective frame position control system of claim 4, wherein the vertically oriented geometry of the position guide is defined by an arc.

6. The protective frame position control system of claim 3, comprising a protection seal covering a region of the position guide in which displacement of the pin occurs.

7. The protective frame position control system of claim 3, wherein a portion of the pin that slides in the position guide comprises a sliding element.

8. The protective frame position control system of claim 7, wherein the sliding element is a bearing.

9. The protective frame position control system of claim 2, wherein the first bearing and the second bearing each comprise:
- an shaft bracket associated with the wheel; and
- a shaft comprising a first portion associated with the shaft bracket and a second portion associated with an outer body a bearing; and
- wherein the outer body houses the bearing and comprises an outer cap closing a first end of the outer body and a bearing seal ring and a protective cap closing a second end of the outer body, the outer body being associated with the wheel protective frame.

* * * * *